Jan. 25, 1949.  M. M. HIMMEL  2,459,940
PARTITION DEVICE FOR COOKING POTS
Filed Nov. 19, 1945
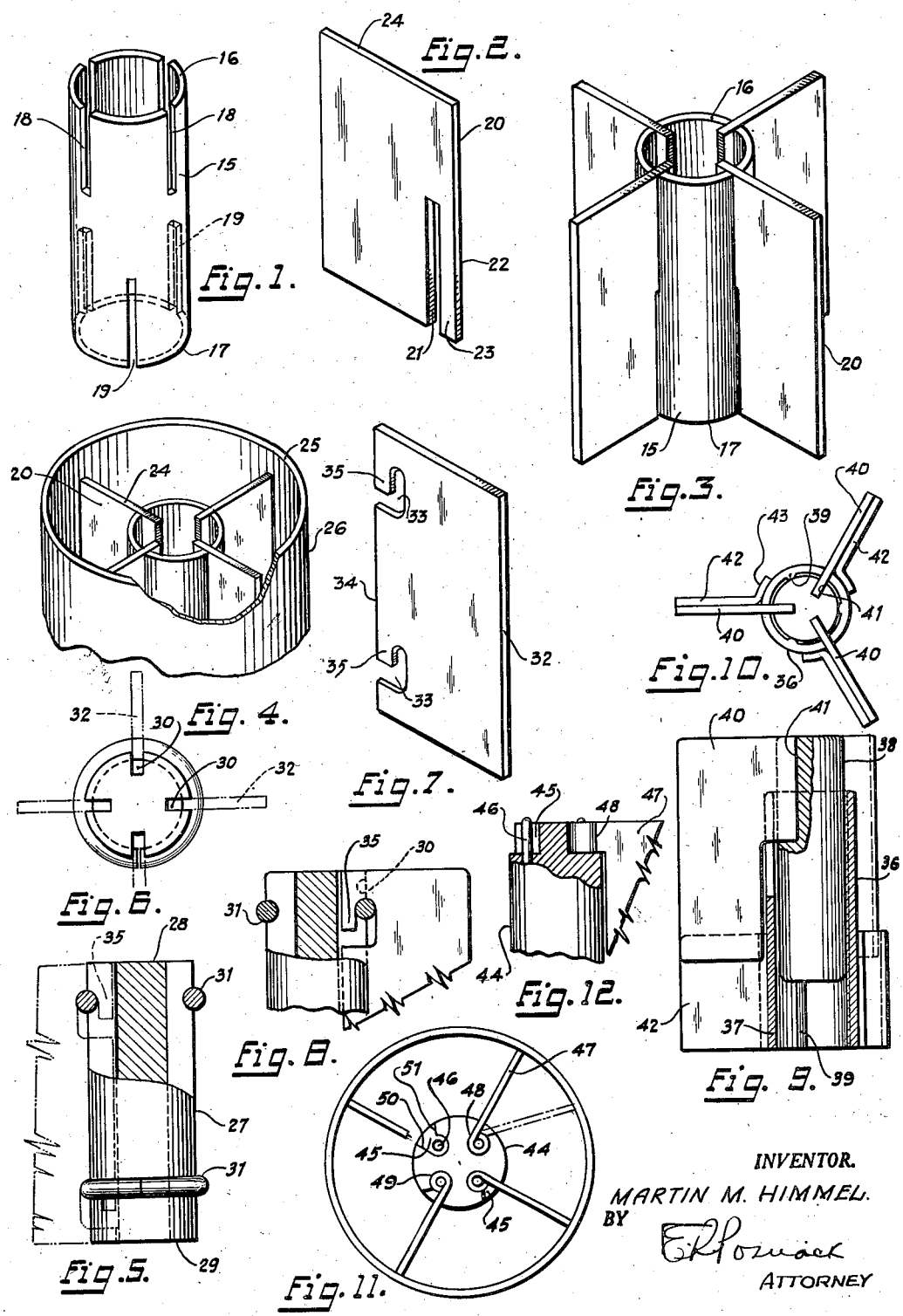
INVENTOR.
MARTIN M. HIMMEL.
BY
ATTORNEY Patented Jan. 25, 1949

2,459,940

UNITED STATES PATENT OFFICE 2,459,940

PARTITION DEVICE FOR COOKING POTS

Martin M. Himmel, New York, N. Y., assignor to Edison Products Corp., New York, N. Y., a corporation of New York Application November 19, 1945, Serial No. 629,465

2 Claims. (Cl. 220—22)

This invention relates to partition devices, particularly of the type adapted for use with pressure cookers and other cooking pots.

Conventional types of pots and cookers have but a single chamber or compartment, being primarily intended for the preparation of a single food dish. When it is desired to employ such units for the simultaneous preparation of several separate foods, there is always the danger that there will be an unwanted mixing of the foods inasmuch as there is no provision for keeping them separated. To provide pots or cookers with integral partitions would not only be expensive, but would also render them unsuited for the preparation of a single food dish.

It is primarily within the contemplation of my invention to provide means for use with conventional cookers and pots for eliminating the above-mentioned difficulties in the preparation of food. More specifically, it is an important object of this invention to provide a partition device that can be conveniently inserted into a pressure cooker or other pot, that will convert the single chamber into a number of separate compartments, and that can be readily removed.

It is another object of my invention to enable a device of the aforesaid class to be readily assembled and disassembled.

Another object is to enable the number of sections comprising the device to be readily changed.

Still another object of my invention is to enable the ready change of the size of the compartments into which my device divides a cooker.

And it is within my contemplation to enable the above-mentioned objectives to be attained with a single easily-fabricated and inexpensive device.

Other objects, features and advantages will appear from the drawings and the description hereinafter given.

Referring to the drawings,

Figure 1 is a perspective view of the partition-supporting member employed in one form of my invention.

Figure 2 is a perspective view of a partition wall adapted for use with the support of Figure 1.

Figure 3 is a perspective view of the assembly of four partition walls and the support therefor, according to my invention.

Figure 4 is a fragmentary perspective of a cooking pot showing the assembly of Figure 3 in place.

Figure 5 is a part section, part elevational view of another form of partition wall support.

Figure 6 is a plan view thereof.

Figure 7 is a perspective view of a partition wall adapted for use with the support of Figure 5.

Figure 8 is a fragmentary elevation, partly in section, showing the partition wall of Figure 7 operatively in place.

Figure 9 is an elevation, partly in section, of another form of my invention.

Figure 10 is a plan view of Figure 9.

Figure 11 is a plan view of still another modification of my invention showing a pivotally supported partition wall, and Figure 12 is a fragmentary elevation, partly in section, of the device of Figure 11.

In the form of my invention illustrated in Figures 1 to 4, the hollow cylindrical support 15 has each of its upper and lower edges 16 and 17, respectively, in one plane, so that either of said edges may serve as a base adapted to rest upon the floor of the pot or cooker. Extending downwardly from upper edge 16 are the spaced parallel vertical slots 18; and extending upwardly from the bottom edge 17 are the spaced parallel vertical slots 19. The partition wall 20, adapted for use with the support of Figure 1, is preferably rectangular in shape, and contains a slot 21 thereon adjacent and parallel to the vertical edge 22. The arrangement is such that the slotted portion 21 is adapted for interlocking engagement with any of the slots 18 or 19. If four of such partition walls 20 are each employed with the device of Figure 1, they will be arranged, as shown in Figure 3, for detachable engagement with the upper slots 18—the leg 23 of each of such walls being disposed within the cylinder—the rest of the wall extending radially outwardly to form four compartments, as is clearly shown in Figure 4. Should it, however, be desired to provide the pot with only three compartments, the support 15 is inverted so that edge 16 rests upon the floor of the pot, and only three walls 20 are brought into operative interlocking engagement with the three slots 19.

It is preferred that the height of support 15 and walls 20 is such that the upper edges 24 of the partition walls will be below the upper edge 25 of the pot 26 (Figure 4). This will permit a circulation of heated air or vapor between all the compartments, due to their intercommunication at the upper part of the pot.

It is thus apparent that with the device above described, a conventional pressure cooker or any other pot may be conveniently provided with partition means, whereby different foods may be simultaneously cooked without any unwanted mixing thereof. And by simply removing the assembly of partition and walls, the pot can be then used as a single-chamber unit, for which it was originally intended. The use of a different number of slots at the top and bottom of the support, together with the ready detachability of the walls, permit considerable flexibility to be attained with respect to the number of compartments desired. And the simplicity of assembling enables it to be used, assembled and disassembled without requiring any special mechanical ability.

In the form of my invention illustrated in Figures 5 to 8, a solid support 27 is employed, also containing a flat top 28 and flat bottom 29. The lateral wall of the support contains a plurality of recesses 30—the recesses being vertically disposed and in spaced parallel relation. In embracing and preferably frictional engagement with the lateral wall and support 27 are the two rings 31, the particular form illustrated showing one ring near the top and another near the bottom. The partition wall 32, adapted for use with support 27, contains the bayonet slots 33 extending inwardly from the inner edge 34. The arrangement of these bayonet slots is such as to form what in effect are two hooks 35 adapted to extend into the recesses 30, and over the rings 31. By this arrangement it is obvious that partition walls 32 are conveniently mounted upon the rings 31, thereby forming a plurality of compartments defined by the said radially disposed walls 32.

In the form of my invention illustrated in Figures 9 and 10, the partition wall support 36 consists of two elements, the outer tube 37 and the inner member 38—members 37 and 38 being fitted for telescopic slidable engagement. In the preferred form of this modification, the inner surface of tube 37 is provided with three inwardly extending beads 39 with which the lateral surface of member 38 is in slidable engagement.

The upper walls 40 are suitably secured to member 38, such as by sweating them into recesses 41. The lower partition walls 42 are secured to tube 37, such as by means of brazing the flanges 43 upon the lateral surface of said tube. The said upper and lower walls 40 and 42 are arranged to correspond with each other whereby they are in slidable engagement. The arrangement is hence such that the height of the partition walls can be varied for use with pots of different sizes.

In the form of my invention illustrated in Figures 11 and 12, the supporting member 44 is provided at the upper portion thereof with a plurality of recesses 45; and disposed within said recesses are the pins 46. The partition walls 47 are each provided with an inwardly extending arm 48, and innermost ends 49 of said arms being curled around the pins 46 thereby forming a pivotal mounting for the partition walls 47. Such partition walls are abuttable with the walls 50 and 51 of the said recesses 45, whereby the pivotal movements of the partition members 47 may be limited by said walls 50 and 51.

The said walls 47 can readily be removed from their mounting, for disassembly, or for varying the number of compartments. The operative pivotal movement of the walls 47 serve to vary the size of the compartments.

In the accompanying drawings, the invention has been shown merely by way of example and in preferred form; but obviously many variations and modifications may be made therein which will still be comprised within its spirit. It is to be understood, therefore, that the invention is not limited to any specific form or embodiment, except insofar as such limitations are specified in the appended claims.

I claim:

1. In a partition device for the interior of a cooker, a solid vertical support with a base in one plane, whereby the support is adapted to rest upon the floor of the cooker, a plurality of spaced vertical recesses in the lateral wall of the support, a ring embracing the lateral wall of the support, and a partition member containing a hooked portion extending into one of said recesses and mounted over the adjacent ring, whereby the partition member is maintained in a vertical position by the support.

2. In a partition device of the class described, the combination according to claim 1, the hooked portion being formed by a bayonet slot extending inwardly from an edge of the partition member.

MARTIN M. HIMMEL.

REFERENCES CITED

The following references are of record in the file of this patent:

UNITED STATES PATENTS

| Number | Name | Date |
|---|---|---|
| 899,244 | Chase | Sept. 22, 1908 |
| 1,290,186 | Held | Jan. 7, 1919 |
| 1,377,846 | Megley | May 10, 1921 |
| 1,480,897 | DeMotte | Jan. 15, 1924 |
| 1,630,140 | Sibbald | May 24, 1927 |
| 1,791,889 | Duncan | Feb. 10, 1931 |
| 1,912,505 | Weston | June 6, 1933 |
| 2,016,488 | Eckhaus | Oct. 8, 1935 |

FOREIGN PATENTS

| Number | Country | Date |
|---|---|---|
| 139,903 | Great Britain | Mar. 18, 1920 |